(12) United States Patent
Marshall

(10) Patent No.: US 12,134,888 B2
(45) Date of Patent: Nov. 5, 2024

(54) END BRACKETS

(71) Applicant: Falkbuilt Ltd., Calgary (CA)

(72) Inventor: Dale R. Marshall, Foothills (CA)

(73) Assignee: Falkbuilt Ltd., Calgary (CA)

(*) Notice: Subject to any disclaimer, the term of this patent is extended or adjusted under 35 U.S.C. 154(b) by 386 days.

(21) Appl. No.: 17/592,689

(22) Filed: Feb. 4, 2022

(65) Prior Publication Data

US 2022/0154451 A1     May 19, 2022

Related U.S. Application Data

(63) Continuation-in-part of application No. 17/063,207, filed on Oct. 5, 2020, now Pat. No. 11,332,924, and a continuation-in-part of application No. 17/498,956, filed on Oct. 12, 2021, now Pat. No. 11,795,683.

(60) Provisional application No. 63/220,889, filed on Jul. 12, 2021, provisional application No. 62/948,524, filed on Dec. 16, 2019.

(51) Int. Cl.
| | |
|---|---|
| *E04B 1/38* | (2006.01) |
| *E04B 2/58* | (2006.01) |
| *E04B 9/30* | (2006.01) |
| *E04C 3/30* | (2006.01) |
| *F16B 7/22* | (2006.01) |
| *F16L 5/00* | (2006.01) |

(52) U.S. Cl.
CPC .............. *E04B 1/388* (2023.08); *E04B 2/58* (2013.01); *E04B 9/30* (2013.01); *E04C 3/30* (2013.01); *F16B 7/22* (2013.01); *F16L 5/00* (2013.01); *E04B 2001/389* (2023.08)

(58) Field of Classification Search
None
See application file for complete search history.

(56) References Cited

U.S. PATENT DOCUMENTS

| | | | |
|---|---|---|---|
| 2,101,952 A | 12/1937 | Anders | |
| 2,696,139 A * | 12/1954 | Attwood | ............... E04B 1/5818 |
| | | | 411/959 |
| 3,323,262 A | 6/1967 | Cesare, Jr. | |
| 3,697,034 A * | 10/1972 | Shell | ...................... A47B 57/42 |
| | | | 248/222.13 |
| 4,048,768 A * | 9/1977 | Good | .................... A47B 57/408 |
| | | | 52/36.6 |

(Continued)

FOREIGN PATENT DOCUMENTS

| | | | | |
|---|---|---|---|---|
| CA | 3076354 A1 | 3/2020 | | |
| CN | 103189583 A * | 7/2013 | ............. | A47B 57/16 |

(Continued)

OTHER PUBLICATIONS

Murray, Tara; "Solid Wall Patent Background"; Haworth; Mar. 13, 2020; 7 pages.

(Continued)

*Primary Examiner* — Joshua K Ihezie
(74) *Attorney, Agent, or Firm* — Fabian VanCott; Steven L. Nichols

(57) ABSTRACT

An end bracket for a wall system includes a body member having attachment structure to join a horizontal strut to a vertical strut. The end bracket further includes attachment structure in which the horizontal strut is slidably attached for moving and positioning the horizontal strut relative to the vertical strut in forming the wall system.

19 Claims, 21 Drawing Sheets

(56) References Cited

U.S. PATENT DOCUMENTS

| | | | |
|---|---|---|---|
| 4,193,233 A | | 3/1980 | Vandenhoek |
| 4,575,295 A | * | 3/1986 | Rebentisch ........... F16B 37/046 |
| | | | 411/85 |
| 4,899,509 A | | 2/1990 | Power |
| 4,905,428 A | * | 3/1990 | Sykes .................... E04B 2/745 |
| | | | 52/270 |
| 4,910,938 A | | 3/1990 | McGee |
| 4,971,281 A | * | 11/1990 | Steinbeck .............. A47B 96/06 |
| | | | 248/222.13 |
| 4,986,047 A | | 1/1991 | Power |
| 5,157,884 A | | 10/1992 | Schwartz |
| 5,279,088 A | | 1/1994 | Heydon |
| 5,377,466 A | * | 1/1995 | Insalaco ................ E04B 2/7437 |
| | | | 52/239 |
| 5,606,836 A | | 3/1997 | Insalaco |
| 5,619,833 A | | 4/1997 | Neff |
| 5,685,662 A | | 11/1997 | Rollin |
| 5,806,258 A | * | 9/1998 | Miedema .............. E04B 2/7437 |
| | | | 52/239 |
| 5,839,240 A | | 11/1998 | Elsholz |
| 5,899,035 A | * | 5/1999 | Waalkes ................ E04B 2/7433 |
| | | | 248/245 |
| 5,992,109 A | | 11/1999 | Jonker |
| 6,003,273 A | | 12/1999 | Elsholz |
| 6,098,358 A | * | 8/2000 | Waalkes ................ E04B 2/7433 |
| | | | 52/36.6 |
| 6,109,461 A | | 8/2000 | Kluge |
| 6,112,485 A | * | 9/2000 | Beyer .................... E04B 2/7437 |
| | | | 52/775 |
| 6,173,545 B1 | * | 1/2001 | Feldpausch .......... A47B 57/425 |
| | | | 52/745.1 |
| 6,213,679 B1 | | 4/2001 | Frobosilo |
| 6,301,846 B1 | * | 10/2001 | Waalkes ................ E04B 2/7433 |
| | | | 52/239 |
| 6,349,516 B1 | | 2/2002 | Powell |
| 6,446,396 B1 | * | 9/2002 | Marangoni ........... E04B 2/7453 |
| | | | 108/50.02 |
| 6,481,177 B1 | | 11/2002 | Wood |
| 6,711,871 B2 | | 3/2004 | Beirise |
| 6,889,477 B1 | | 5/2005 | Kottman |
| 7,051,482 B2 | * | 5/2006 | MacDonald .......... E04B 2/7425 |
| | | | 52/239 |
| 7,448,168 B2 | * | 11/2008 | Waalkes ................ E04B 2/7433 |
| | | | 52/36.5 |
| 7,694,483 B1 | | 4/2010 | Tucker |
| 8,015,767 B2 | | 9/2011 | Glick |
| 8,234,983 B2 | * | 8/2012 | Randolph ............. A47B 47/022 |
| | | | 248/235 |
| 8,695,310 B2 | * | 4/2014 | Tremblay ................ E04C 3/292 |
| | | | 52/775 |
| 9,255,403 B1 | | 2/2016 | Lehane |
| 9,963,869 B1 | | 5/2018 | Mironchuk |
| 10,041,288 B1 | | 8/2018 | Flood |
| 10,323,412 B2 | | 6/2019 | Koziol |
| 10,738,466 B1 | | 8/2020 | Boyce |
| 11,142,901 B2 | * | 10/2021 | Friedlos ................ E04B 1/2403 |
| 11,795,683 B2 | * | 10/2023 | Hinton ...................... F16B 7/22 |
| 2001/0039774 A1 | | 11/2001 | Beirise |
| 2002/0062617 A1 | | 5/2002 | Di Girolamo |
| 2002/0157335 A1 | * | 10/2002 | Vos .......................... E04B 2/821 |
| | | | 52/239 |
| 2003/0049094 A1 | * | 3/2003 | Westlake .............. F16B 37/046 |
| | | | 411/84 |
| 2003/0070377 A1 | * | 4/2003 | Waalkes ................ E04B 2/7433 |
| | | | 52/481.2 |
| 2003/0089057 A1 | * | 5/2003 | Wiechecki ............ E04B 2/7427 |
| | | | 52/238.1 |
| 2004/0231271 A1 | | 11/2004 | Bruno |
| 2005/0034408 A1 | | 2/2005 | Palumbo |
| 2005/0247654 A1 | | 11/2005 | Walker |
| 2006/0016139 A1 | | 1/2006 | Beck |
| 2006/0236625 A1 | | 10/2006 | MacDonald |
| 2008/0060288 A1 | | 3/2008 | Frobosilo |
| 2008/0104922 A1 | * | 5/2008 | Glick .................... E04B 2/7425 |
| | | | 52/630 |
| 2009/0013639 A1 | * | 1/2009 | Tremblay ................. E04B 5/02 |
| | | | 52/745.13 |
| 2009/0193735 A1 | | 8/2009 | Kalinowski |
| 2010/0006518 A1 | | 1/2010 | Brobst |
| 2013/0091691 A1 | | 4/2013 | Oetlinger |
| 2013/0126454 A1 | * | 5/2013 | Zang ..................... A47B 57/406 |
| | | | 211/183 |
| 2014/0331564 A1 | | 11/2014 | Wei |
| 2016/0069072 A1 | | 3/2016 | Rice |
| 2016/0168863 A1 | | 6/2016 | Kwan |
| 2016/0273214 A1 | * | 9/2016 | Kopish ................... E04B 2/827 |
| 2017/0022707 A1 | * | 1/2017 | Feldpausch ........... E04B 2/7457 |
| 2017/0204600 A1 | | 7/2017 | Daudet |
| 2018/0094422 A1 | | 4/2018 | Getz |
| 2018/0094431 A1 | * | 4/2018 | Koziol ................... E04F 13/081 |
| 2018/0347615 A1 | * | 12/2018 | Martin .................... F16B 2/245 |
| 2019/0071869 A1 | | 3/2019 | Maley |
| 2019/0249418 A1 | | 8/2019 | Chapman |
| 2019/0380492 A1 | * | 12/2019 | Heap ..................... A47B 57/404 |
| 2020/0318339 A1 | | 10/2020 | Friedlos |
| 2021/0079648 A1 | * | 3/2021 | Viebahn .................. E04B 2/825 |
| 2021/0180315 A1 | | 6/2021 | Marshall |

FOREIGN PATENT DOCUMENTS

| | | |
|---|---|---|
| JP | 01058767 A | 3/1989 |
| WO | 2012039678 | 3/2012 |
| WO | WO 2012/039678 A1 | 3/2012 |
| WO | 2017069698 | 4/2017 |

OTHER PUBLICATIONS

Author unknown; Teknion Leveler Foot Image; 1 page; Retrieved from online search in Apr. 2019.

Slotted Standard Hooks Image; Retrieved from internet search Jun. 2019; 1 page.

Racking Images; Retrieved from internet search Apr. 2019; 1 page.

https://www.bmp-group.com/; viewed website on Feb. 3, 2022; 3 pages.

https://www.clarkdietrich.com/; viewed website on Feb. 3, 2022; 3 pages.

* cited by examiner

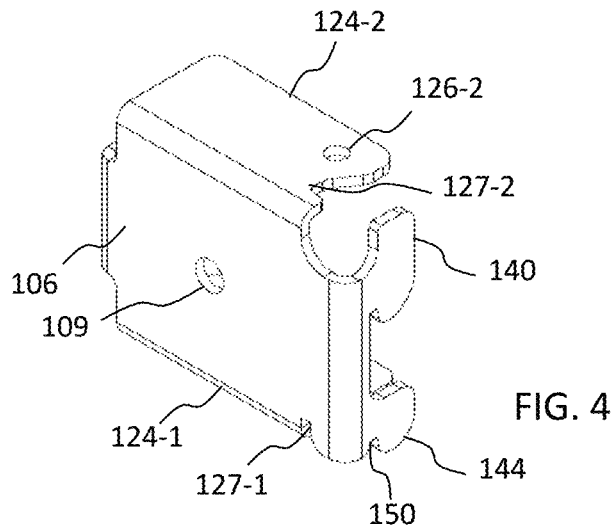
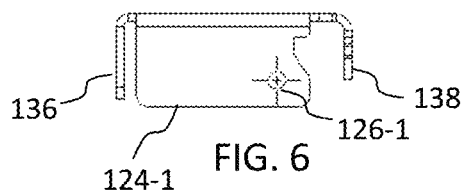
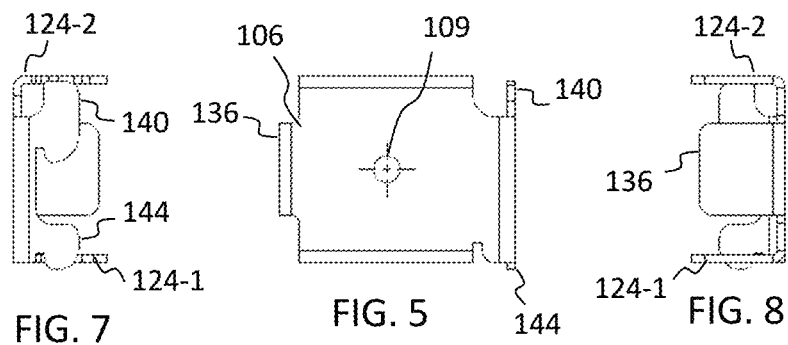
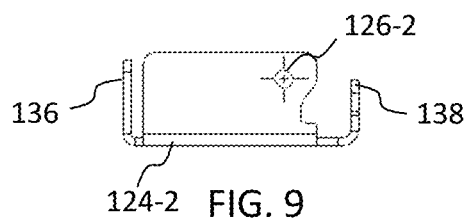

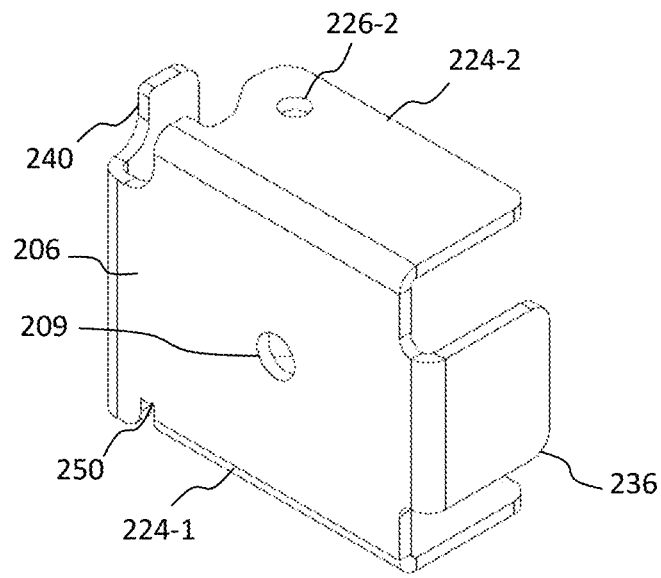
FIG. 10
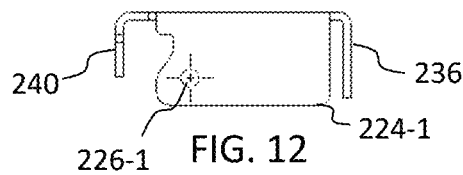
FIG. 12
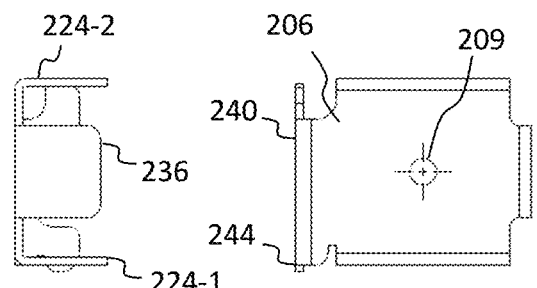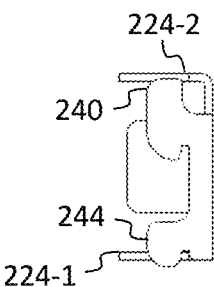
FIG. 13　　FIG. 11　　FIG. 14
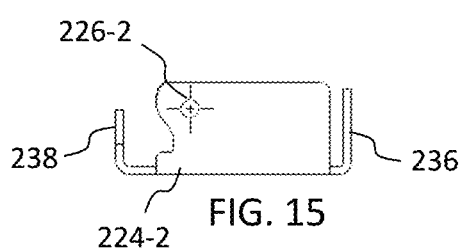
FIG. 15

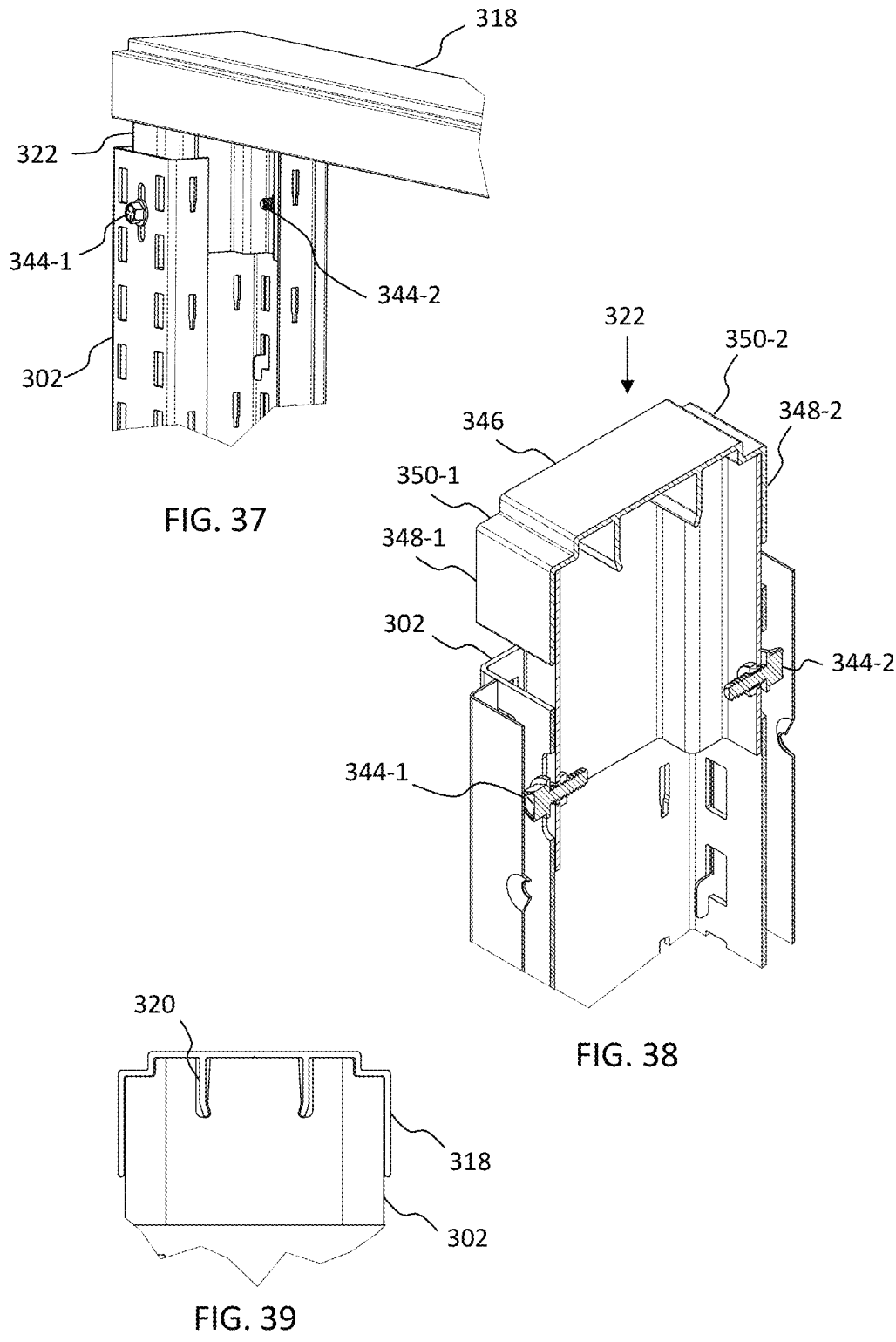

END BRACKETS

CROSS-REFERENCE TO RELATED APPLICATIONS

The present application is a continuation-in-part of U.S. application Ser. No. 17/063,207 filed on Oct. 5, 2020, which claims priority to U.S. Provisional Application No. 62/948,524 filed on Dec. 16, 2019, entitled "END BRACKETS". The present application is also a continuation-in-part of U.S. application Ser. No. 17/498,956 filed on Oct. 12, 2021, entitled "DROP-IN CEILING WALL SYSTEM". The present application also claims priority to U.S. Provisional Application No. 63/220,889 filed Jul. 12, 2021, entitled "HYBRID WALL SYSTEM". These applications are incorporated herein by reference in their entireties.

BACKGROUND

Digitized wall systems provide innovative solutions over drywall installation by providing manufactured wall components to be used for quick and efficient onsite installation.

BRIEF DESCRIPTION OF THE DRAWINGS

FIG. 4 illustrates a perspective view of an end bracket according to an example of the principles described herein.

FIG. 5 illustrates a bottom view of an end bracket according to an example of the principles described herein.

FIG. 6 illustrates a side view of an end bracket according to an example of the principles described herein.

FIG. 7 illustrates a side view of an end bracket according to an example of the principles described herein.

FIG. 8 illustrates a side view of an end bracket according to an example of the principles described herein.

FIG. 9 illustrates a side view of an end bracket according to an example of the principles described herein.

FIG. 10 illustrates a perspective view of an end bracket according to an example of the principles described herein.

FIG. 11 illustrates a bottom view of an end bracket according to an example of the principles described herein.

FIG. 12 illustrates a side view of an end bracket according to an example of the principles described herein.

FIG. 13 illustrates a side view of an end bracket according to an example of the principles described herein.

FIG. 14 illustrates a side view of an end bracket according to an example of the principles described herein.

FIG. 15 illustrates a side view of an end bracket according to an example of the principles described herein.

FIG. 37 illustrates a perspective view of a top connector connecting a top track to a top leveler support according to an example of the principles described herein.

FIG. 38 illustrates a perspective view of a top leveler support according to an example of the principles described herein.

FIG. 39 illustrates a front view of a top connector attached to a top leveler support according to an example of the principles described herein.

DETAILED DESCRIPTION

Figure 1:
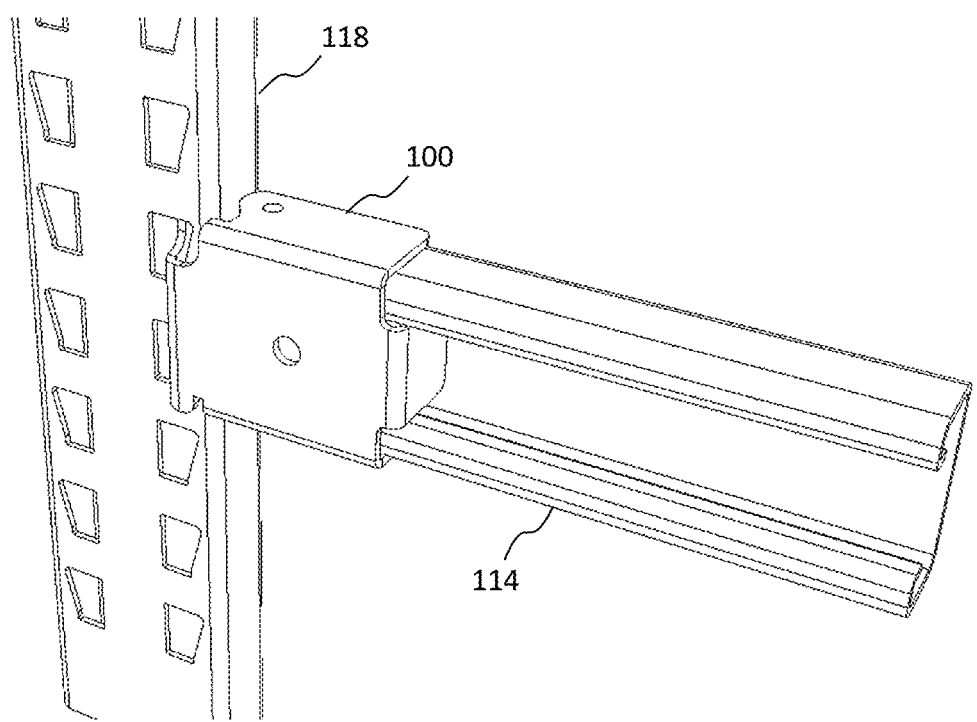
FIG. 1 illustrates a perspective view of horizontal and vertical strut with an end bracket according to an example of the principles described herein.

In general, construction projects may involve the purchase and delivery to a job site of 30% more materials than what is needed. These projects rely on materials/tools such as screw guns, time, garbage bins, and a laborer to fill the garbage bins with waste created from the construction. When the project is completed, the bin is hauled to a dump.

In another example referred to as modular construction, everything needed is built in a factory, loaded in trucks, and then taken to a jobsite. After the walls or room modules are unloaded, the modules are placed side-by-side in precisely designated locations and orientations. Each module is then individually leveled and attached to adjacent modules.

The present specification describes a construction method that combines aesthetics with high-performing and cost-effective environments. Work spaces, classroom settings, and hospital rooms are just a few examples of environments in which these construction methods may be used.

The present specification describes digital component construction. Using digital technology, individual components are precisely manufactured and then delivered and installed in the same manner and by the same trades as conventional construction. There is no need, however, for clean up or waste removal. The cost remains competitive with conventional and modular constructions.

As part of a digital component construction, various horizontal and vertical struts are dimensioned based on a digital layout and then manufactured according to those dimensions. They are then used to provide a framework in which panels, shelving, cabinets, and other structures can be attached. To ensure a proper fit between strut members, end brackets are used that allow for the struts to be shortened or lengthened anywhere from millimeters, centimeters, to inches, and feet, depending on the size of the end bracket.

In an example, an end bracket for a wall system includes a body member having a first attachment structure to join a horizontal strut to a vertical strut. The end bracket further includes a second attachment structure in which the horizontal strut is slidably attached for moving and positioning the horizontal strut relative to the vertical strut in forming the wall system. At least a portion of the end bracket is available to lengthen the horizontal strut depending on the position of the horizontal strut.

In another example, an end bracket for a wall system includes a body member that has a substantially planar body member. The end bracket further includes an attachment structure having a pair of lateral, planar plates extending orthogonally from opposed vertical ends of the body member. A planar insert member extends orthogonally from a side of the body member. The planar insert member has an arm-like configuration so as to be inserted within a slot of the vertical strut to removably engage the body member to the vertical strut and prevent dislodgment of the body member from the vertical strut. At least a first set hole is located on at least one of the planar plates and spaced a width apart from the insert member. At least a second set hole is centrally located on the body member. The end bracket is to be attached to at least one slot of a vertical struct by inserting the insert member within the slot. A horizontal strut is to be slidably inserted between the planar plates and secured to the end bracket at a desired horizontal position relative to the end bracket. Screws may be screwed into the first and second set holes to secure the horizontal strut to the end bracket at the desired horizontal position.

In another example, an end bracket for a wall system includes a body member with a substantially planar body member. The end bracket further includes attachment structure with a pair of spaced and substantially parallel, planar, vertical plates extending orthogonally from opposed vertical ends of the body member. Each plate is symmetrical to each other around a central horizontal axis of the end bracket. Each plate also includes a notch at or near an intersection of the body member and respective planar plate.

The end bracket further includes a planar insert member extending orthogonally from a lateral end of the body member. The insert member is to be inserted within a slot of a vertical strut to removably engage the end bracket to the vertical strut and prevent dislodgement of the end bracket from the vertical strut. A horizontal strut is to be slidably mounted between the planar plates of the attachment structure and moved to a desired position. Each notch provides a visibility gap between an outer side of the vertical strut and an outer side of each planar plate in which a position of a free end of the horizontal strut may be viewed. The end bracket includes a locking structure to secure the horizontal strut at a desired position relative to the end bracket.

Turning to FIG. 1, an end bracket 100 is shown that attaches a horizontal strut 114 to a vertical strut 118, according to an example of principles described herein. The end bracket 100 includes a rectangular, cube-like joint that connects the two long members of the struts 114 and 118 together. While small in comparison to the struts 114 and 118, the end bracket 100 includes attachment structure that not only provides a strong and secure connection between the struts 114 and 118, but also enables significant structural changes that can make a wall system stronger and more stable.

Particularly, the end bracket 110 attaches at or near a free end of the horizontal strut 114 to attach the horizontal strut 114 at a location along a longitudinal length of the vertical strut 118. The end bracket 110 may attach at various locations along the vertical strut 118 depending on the type of connections available along the longitudinal length of the vertical strut 118. The end bracket 100 is shown attached at or near an edge of a back side of the vertical strut 118, however the attachment may occur on a side of the vertical strut 118 or other location where possible.

The horizontal strut 114 slides within a cavity of the end bracket 100 in a longitudinal, horizontal direction and is thereby relatively lengthened or shortened to provide a variable length in which to support the vertical strut 118.

Figure 2:
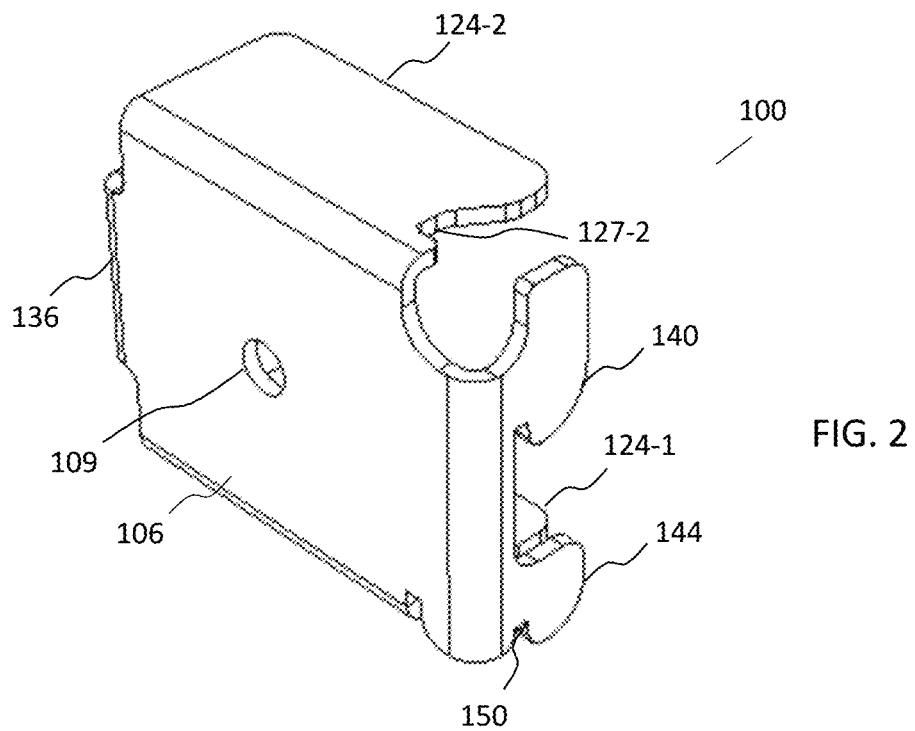
FIG. 2 illustrates a perspective view of an end bracket according to an example of the principles described herein.
Figure 3:
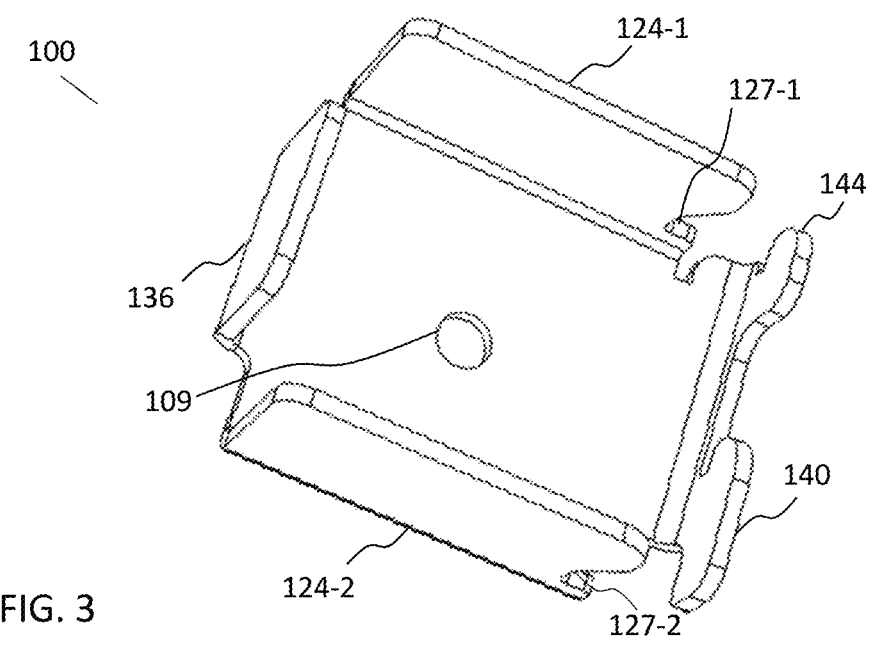
FIG. 3 illustrates a perspective view of an end bracket according to an example of the principles described herein.

Turning to FIGS. 2 and 3, various views of an end bracket 100 are shown. The end bracket 100 includes a body member 106 which is a substantially planar body member. Attached to free ends of the body member 106 is the attachment structure.

The term "attachment structure" is used collectively herein to refer to one or more various structures that are used to attach the end bracket 100 to the horizontal 114 and vertical struts 118. For example, the attachment structure may include at least one insert member (first 140 and second insert members 144), planar plates 124, and extension member 136, as shown.

The attachment structure enables the horizontal strut 114 to be slidably mounted so as to move horizontally relative to the end bracket 100 and thus have a variable apparent length. For example, the horizontal strut 114 can be lengthened or shortened between two vertical struts 118 to accommodate slight differences in a theoretical layout compared to an actual layout. Differences between layouts may be caused by inaccurate measurements, imperfect ground surfaces, imperfect materials, effects on materials from temperature and humidity, changes made between layouts, as well as other causes. Also, laymen may desire various tightness of fit of the horizontal strut 114 with the vertical strut 118 and may want to lengthen or shorten the horizontal strut 114 to achieve that purpose. The end bracket 100 further enables a variable length to provide a desired precision of fit or tightness between a horizontal and vertical strut.

The end bracket 100 may further include a locking structure, such as a central hole 109 which is a set hole centrally located on the body member 106 that enables a screw disposed therethrough to ensure that the fit or tightness between the horizontal strut 114 and the end bracket 100 remains secure.

At least one insert member may be used for attaching the end bracket 100 to the vertical strut 118. As shown, an insert member includes a first insert member 140 and a second insert member 144 that extend orthogonally from a side of the body member 106. The first insert member 140 includes a flat arm-like or hook-like planar member that extends vertically upward to be removably inserted within a first slot of the vertical strut 118. From the same side of the body member 106, opposing second insert member 144 includes a flat arm-like or hook-like planar member that extends vertically downward to be removably inserted within a second slot of the vertical strut 118. The arm of the first insert member 140 extends farther upward than the second insert member 144 to prevent upward movement and rotational movement that would release the end bracket 100 from the vertical strut 118. The second insert member 144 includes a divet 150 on a bottom facing side with sides of the divet 150 extending vertically downward to engage around the same or different slot as the first insert member 140 and thereby provide a rest or horizontal support for the end bracket 100, prevent dislodgement and retain the end bracket 100 vertically to the vertical strut 118.

The extension member 136 includes a planar arm member extending orthogonally from a lateral side of the body member 106 and opposite to the first 140 and second insert members 144. The extension member 136 is to be received between sides of the horizontal strut 114 to support the horizontal strut 114 and prevent rotation of the horizontal strut 114 relative to the end bracket 100. As shown, the extension member 136 is centrally located along a side of the body member 106 and has a vertical length that is less than the vertical length of the body member 106 so as to fit within rails of a horizontal strut 114.

A pair of planar plates 124-1, -2 extend orthogonally from opposed vertical ends of the body member 106. Each plate 124-1, -2 is symmetrical to each other around a central horizontal axis of the end bracket 100. Each plate 124-1, -2 includes a notch 127-1, -2 on a side of the plate adjacent to first 130 and second insert members 144. The notch 127-1, -2 is a rounded cutout that juts inward toward the inner portion of the respective plate 124-1, -2. The outer edge of each plate 124-1, -2 appears to have an undulating or contoured edge that provides a gap for visibility of the underlying horizontal strut 114 as it passes through the end bracket 100. The cutout out may have sharp corners instead.

The horizontal strut 114 is to be slidably mounted between the planar plates 124-1, -2. The horizontal strut 114 is to be horizontally moved between the plates 124-1, -2 to a desired position relative to the plates 124-1, -2.

The end bracket 100 further includes a locking structure to attach the end bracket 100 to the horizontal strut 114 once the horizontal strut 114 is in the desired position. As shown, a central hole 109, a set hole or other type of hole, is located on the body member 106. The central hole 109 extends therethrough and is centrally located on the body member 106. The locking structure may include a screw that is screwed through the central hole 109 to attach the end bracket 100 to the horizontal strut 114.

Turning to FIGS. 4-9, various views of the end bracket 100 are shown. The end bracket 100 in FIGS. 4-9 is a left end bracket with respect to a back view perspective. The end bracket 100 is used to secure a left end of a horizontal strut 114 to a vertical strut 118 with the body member 106 shown on the outside of the horizontal strut 114.

Figure 20:
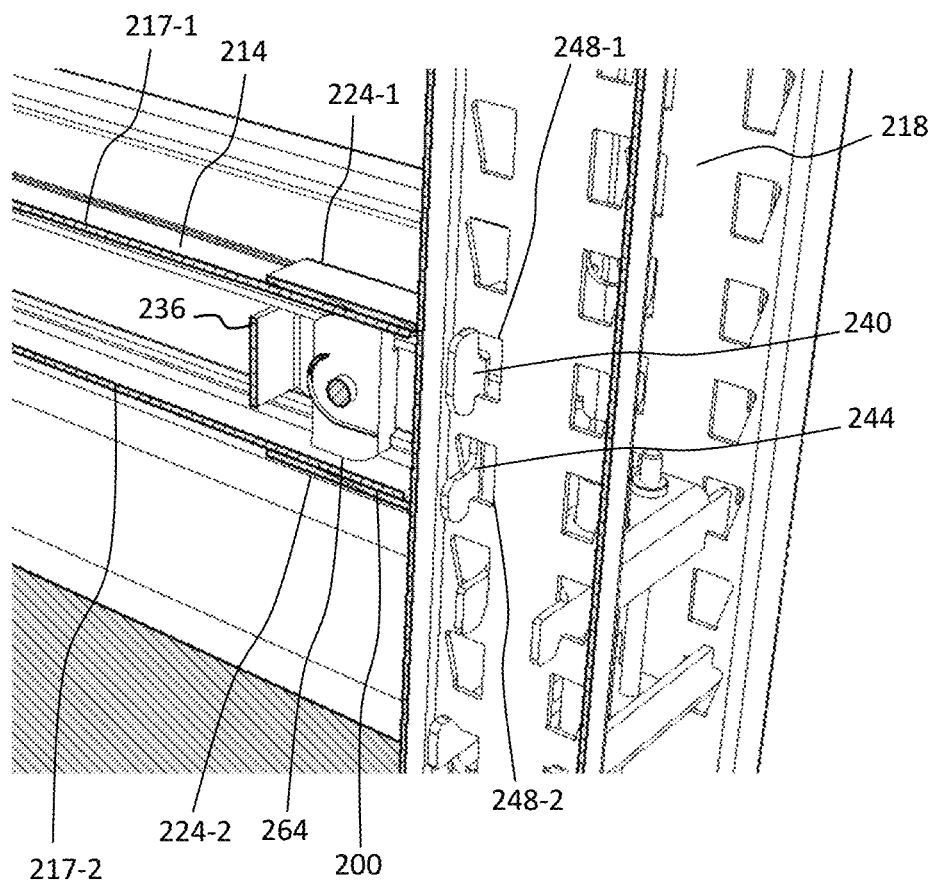
FIG. 20 illustrates a perspective view of a horizontal strut attached to a vertical strut with an end bracket according to an example of the principles described herein.

FIGS. 10-15 illustrate corresponding views of a right end bracket 200 from a back view perspective. With reference to FIG. 20, the right end bracket 200 is used to secure a right end of a horizontal strut 214 to a vertical strut 218 with the body member 206 shown on the outside of the horizontal strut 214. The right 200 and left end brackets 100 are mirror images of each other, as shown.

Both end brackets 100 and 200 include the same or similar attachment structure. For example, the end brackets 100 and 200 each have respective sets of planar plates 124-1, -2 and 224-1, -2 that extend orthogonally from opposed vertical ends of respective body members 106 and 206. Both end brackets 100 and 200 further include respective extension members 136 and 236 and respective insert members that include first 140, 240, and second insert members 144 and 244.

The various views illustrate relative dimensions of the various attachment structure. For example, the planar plates 124-1, -2 and 224-1, -2 extend outward by the greatest length, followed by the extension members 136 and 236, followed by the insert members 140, 240, 144, and 244. The central holes 109 and 209 are central to respective body members 106 and 206 by the vertical and lateral lengths excluding the portions with the notches 127-1, -2 and 227-1, -2 and divets 150 and 250. In other words, an imaginary orthogonal line drawn on the body members 106 and 206 from vertical edges that excludes portions with notches 127-1, -2 and 227-1, -2 and divets 150 and 250 is used to define a starting edge of the area of the body member 106 and 206 in which to find a central hole 109 and 209.

In other examples, the central holes 109 and 209 are measured from outermost vertical and lateral edges of the body members 106 and 206. In further examples, at least one hole is found to be more vertical or more lateral than the central holes 109 and 209 depicted.

Also shown are set holes 126-1, -2 and 226-1, -2 that includes holes on respective planar plates 124-1, -2 and 224-1, -2 and which are used for screws to fasten planar plates 124-1, -2 and 224-1, -2 to side rails 217-1, -2 of a horizontal strut. Screws in set holes 126-1, -2 and 226-1, -2 provide additional support for the screws 158, 258 used in the central holes 109 and 209. (See FIG. 25). Note that set holes 126-2 and 109 are horizontally offset from each other. Such a configuration prevents rotation and dislodgement of the horizontal strut 214 once the horizontal strut 214 is positioned according to a desired location within the end bracket 200.

Figure 16:
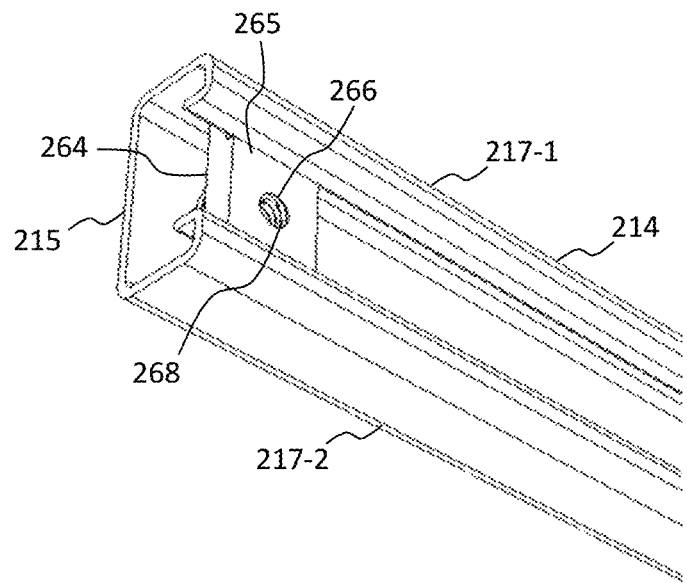
FIG. 16 illustrates a perspective view of a horizontal strut and spring nut according to an example of the principles described herein.

To assemble a horizontal strut with an end bracket, a spring nut is first inserted within the horizontal strut. Turning to FIG. 16, a horizontal strut 214 is shown being configured with spring nut 264. The horizontal strut 214 may include at least one of a rail, slide, channel, slot, or other structure to enable insertion of the spring nut 264 as well as enable linear movement of the end bracket 200 in relation to the horizontal strut 214 and in a horizontal direction. As shown, the horizontal strut 214 includes a main body 215 which is an elongated flat rectangular member having side rails 217-1, -2. Side rails 217-1, -2 that include elongated flat planar members extend orthogonally from vertical edges of the main body 215. Free ends of the flat planar members 217-1, -2 bend vertically downward and then bend again so as to wrap around themselves. The flat planar members 217-1, -2 essentially form a cavity in which one or more components may be slidably inserted.

Figure 19:
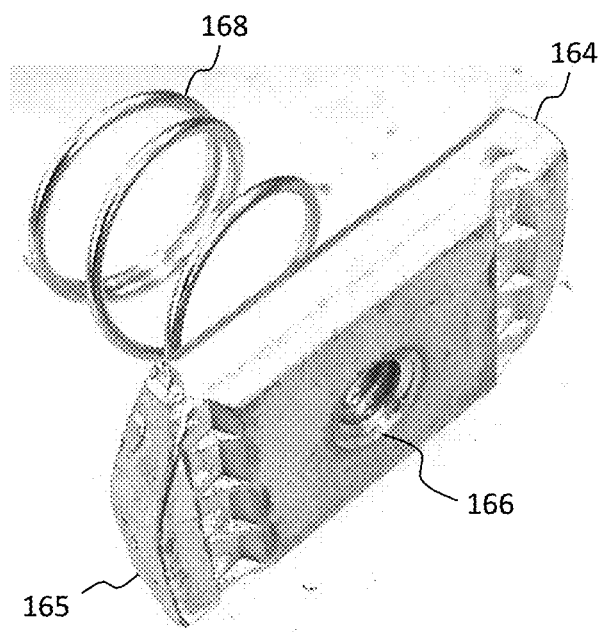
FIG. 19 illustrates a perspective view of a spring nut according to an example of the principles described herein.

As shown, the spring nut 264 is slidably inserted in between the side rails 217-1, -2. FIG. 19 shows a more detailed view of the spring nut 264, which includes a spring 268 attached to a flat body 265 that is a generally flat square or rectangular member. A threaded hole 266 is centrally located on the flat body 265. The flat square sides of the flat body 265 enable the spring nut 264 to slide smoothly along the side rails 217-1, -2 without rotation or other unnecessary movement. Within the side rails 217-1 and 217-2, the spring nut 264 is placed so that the spring 268 is pressed against the main body 215 and the flat body 265 of the spring nut 264 is pressed against free ends of the side rails 217-1, -2.

Figure 17:
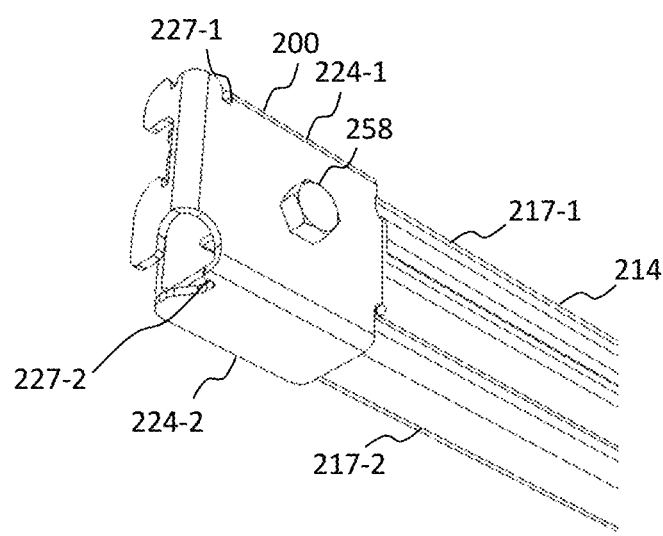
FIG. 17 illustrates a perspective view of a horizontal strut and end bracket according to an example of the principles described herein.

FIG. 17 illustrates the left end bracket 200 attached to the spring nut 264 (FIG. 16) with side rails 217-1 and 217-2 of the horizontal strut 214 being sandwiched. Planar plates 224-1, -2 of the left end bracket 200 extend around outer surfaces of respective side rails 217-1, -2. A screw 258 tightens the end bracket 200 to the spring nut 264 and thereby secures the end bracket 200 to the horizontal strut 214. The spring nut 264 and end bracket 200 slide in tandem longitudinally along the horizontal strut 214 so that the end bracket 200 can be tightened at any location along the length of the horizontal strut 214.

Figure 18A:
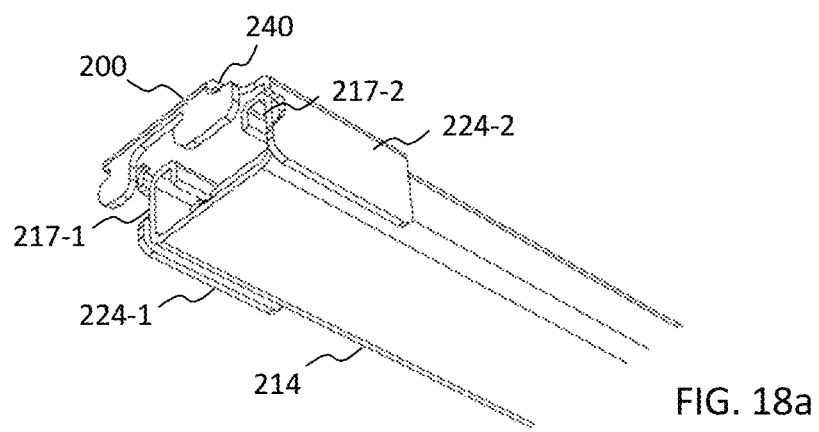
FIG. 18a illustrates a perspective view of a horizontal strut and end bracket according to an example of the principles described herein.
Figure 18B:
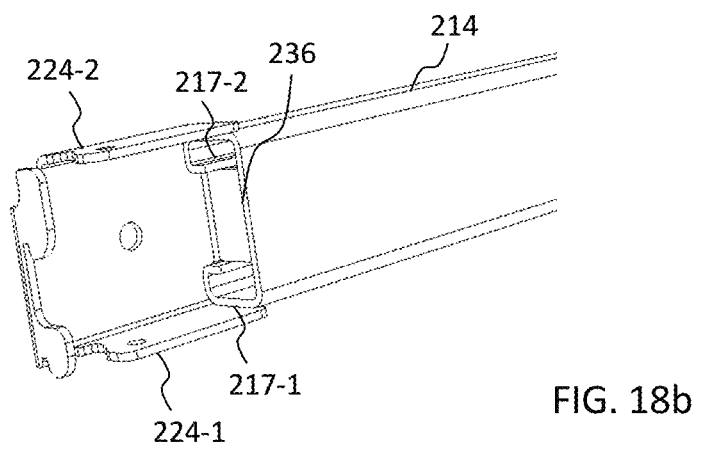
FIG. 18b illustrates a perspective view of a horizontal strut and end bracket according to an example of the principles described herein.

FIGS. 18a and 18b illustrate perspective views of the horizontal strut 214 being inserted within the left end bracket 200. In both views, the insertion is only a partial insertion with edges of the left end bracket 200 sticking out past outer edges of the horizontal strut 214. The horizontal strut 214 is inserted so that side edges of the extension member 136 extend between inside surfaces of side rails 217-1 and 217-2 of the horizontal strut 214. The extension member 136 provides a guide and a stable frame in which the horizontal strut 214 can be slidably joined. On the outside of the horizontal strut 214, planar plates 224-1, -2 surround outside surfaces of rails 217-1,-2 of the horizontal strut 214. The planar plates 224-1, -2 also ensure a guide and a stable frame in which the horizontal strut 214 can be slidably joined.

In each scenario, the notches 227-1, -2 provide a visibility window or space in which the horizontal strut 214 may extend so as to increase the apparent length that the horizontal strut 214 provides. The screw 258 is used to fixate the horizontal strut 214 to the left end bracket 200 to the desired length, such as the length shown in FIG. 18a.

FIG. 20 shows a perspective view of the left end bracket 200 secured to the horizontal strut 214 and vertical strut 218. The extension member 236 can be seen inserted between planar plates 224-1, -2. Note that the lengths shown of the extension member 236 and the planar plates 224-1, -2 do not extend past the lengths of the rails 217-1, -2. The left end bracket 200 thus appears to seamlessly merge with dimensions of the horizontal strut 214. This maintains a relatively even weight distribution along the horizontal strut and avoids extra forces such as bending and torsional forces. Examples may include, however, that lengths are not the same and that at least one of the extension member 236 and planar plates 224-1, -2 extends past the lengths of the rails 217-1, -2.

First insert member 240 extends upward in upper slot 248-1 of vertical strut 218 so as to secure the left end bracket 200 and restrict longitudinal and rotational movement of the left end bracket 200. Second insert member 244 extends downward for resting the left end bracket 200 against edges of a lower slot 248-2 of the vertical strut 218.

Figure 21:
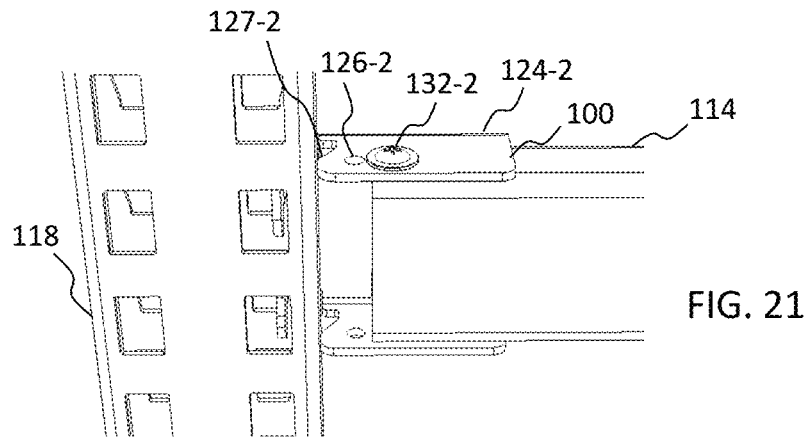
FIG. 21 illustrates a back view of a horizontal strut attached to a vertical strut with an end bracket according to an example of the principles described herein.
Figure 22:
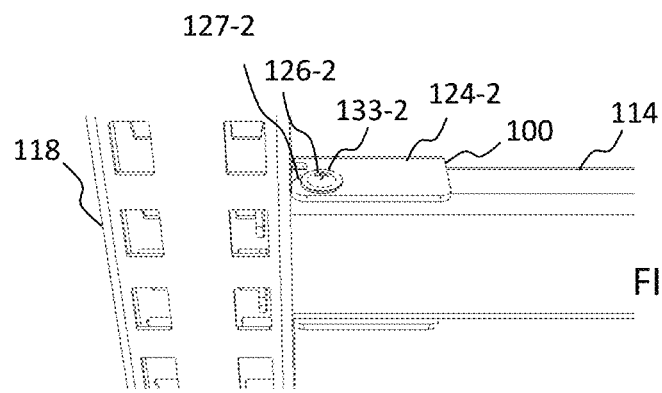
FIG. 22 illustrates a back view of a horizontal strut attached to a vertical strut with an end bracket according to an example of the principles described herein.
Figure 23:
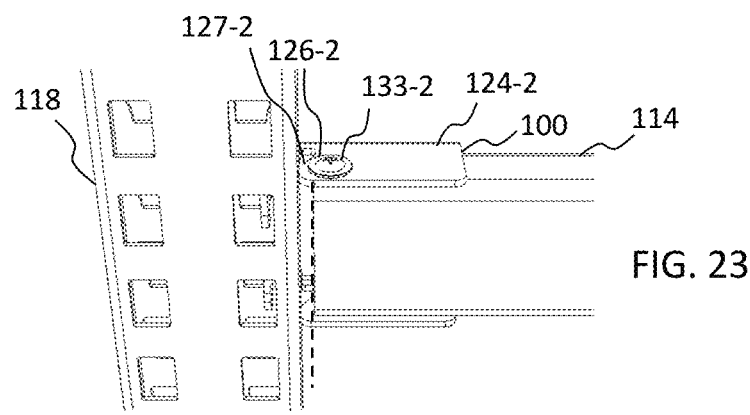
FIG. 23 illustrates a back view of a horizontal strut attached to a vertical strut with an end bracket according to an example of the principles described herein.

FIGS. 21-23 illustrate examples of locations of the horizontal strut 114 made possible by the right end bracket 100. The end bracket 100 includes a length that structurally accommodates longitudinal, horizontal movement of the horizontal strut 114 within the end bracket 100. The length of the end bracket 100 still supports a substantial length of the horizontal strut 114 once the horizontal strut 114 is positioned such that the horizontal strut 114 experiences no sagging or weakness that would lessen the structural integrity of the horizontal strut 114. Movement of the horizontal strut 114 may be restricted to a length that maintains the structural integrity. For example, movement may be restricted to a length that is less than half the length of the end bracket 100. In another example, the position of the screw 132-2, 133-2 may be restricted to a position or a range of positions to maintain the structural integrity.

FIG. 21 depicts a maximum fit in which the horizontal strut 114 is moved longitudinally within the end bracket 100 such that it is spaced away from the vertical strut 118 by a distance that supersedes the distance of the set hole 126-2 from the vertical strut 118. Not using the set hole 126-2, a self-drilling screw 132-2 can still be used to tighten the right end bracket 100 into the horizontal strut 114. A self-drilling screw 132-2 or a regular screw that goes through the set hole 126-2 can penetrate the material of the horizontal strut 114 or provide a mere pressure fit.

FIG. 22 depicts a minimum fit in which the horizontal strut 114 is moved longitudinally within the end bracket 100 until it contacts the outer side of the vertical strut 118. A regular screw 133-2 is used to screw into the set hole 126-2. In this example, the end bracket 100 may still be used to provide support at the intersection of the two struts 114 and 118. Also, for wall systems that are modular or for spaces where future remodeling is anticipated, it is still useful to have an end bracket 100 in place.

FIG. 23 depicts a nominal fit in which the horizontal strut 114 is moved longitudinally within the end bracket 100 until it is lined up with an imaginary line that is orthogonal to vertical main body 115 and that excludes the portion area that of the notch 127-2. This line is indicated by a dashed line. The nominal fit includes a range of positions of the horizontal strut 114 within the end bracket 100 in which the set hole 126-2 can be used. A regular screw 133-2 can be used to screw into the set hole 126-2.

Figure 24:
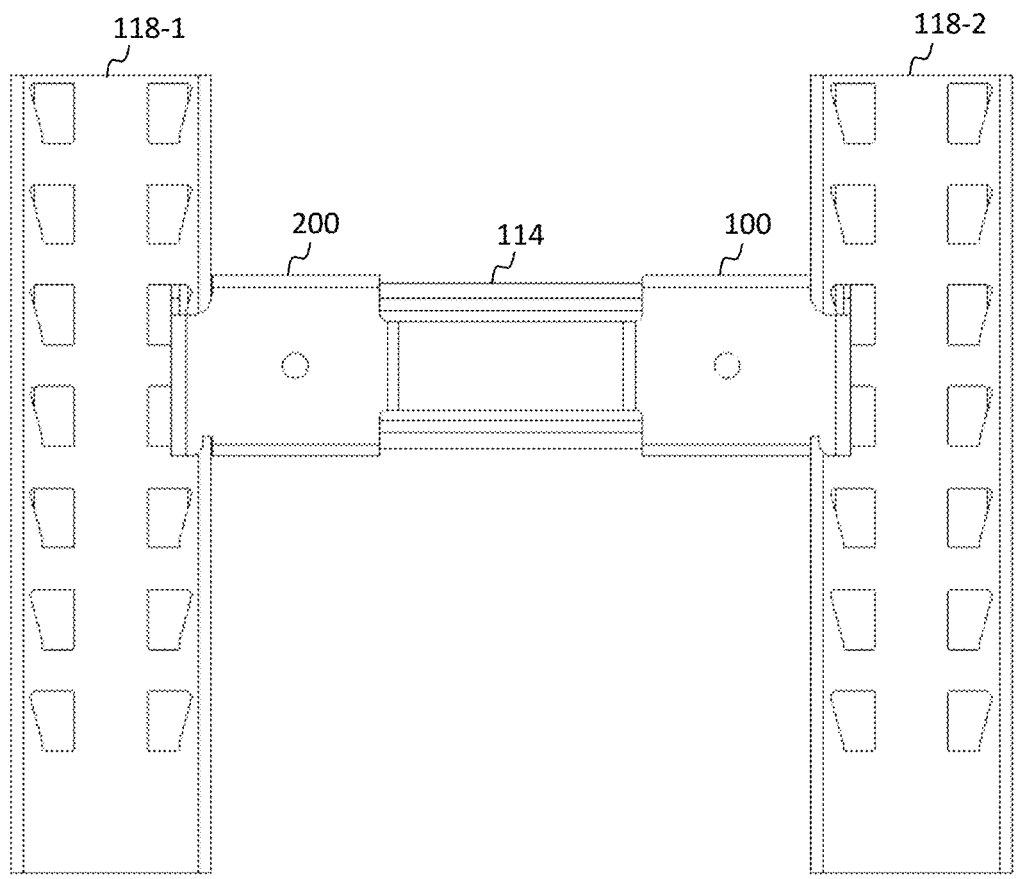
FIG. 24 illustrates a front view of a horizontal strut attached between two vertical strut with end brackets according to an example of the principles described herein.

FIG. 24 illustrates both a left end bracket 200 and a right end bracket 100 used to attach a horizontal strut 114 between vertical struts 118-1 and 118-2. Both left 200 and right end brackets 100 allow for variable distances of the horizontal strut 114 to make slight adjustments in millimeter or centimeter lengths and also create the type of fit desired, whether it be snug or tight.

Figure 25:
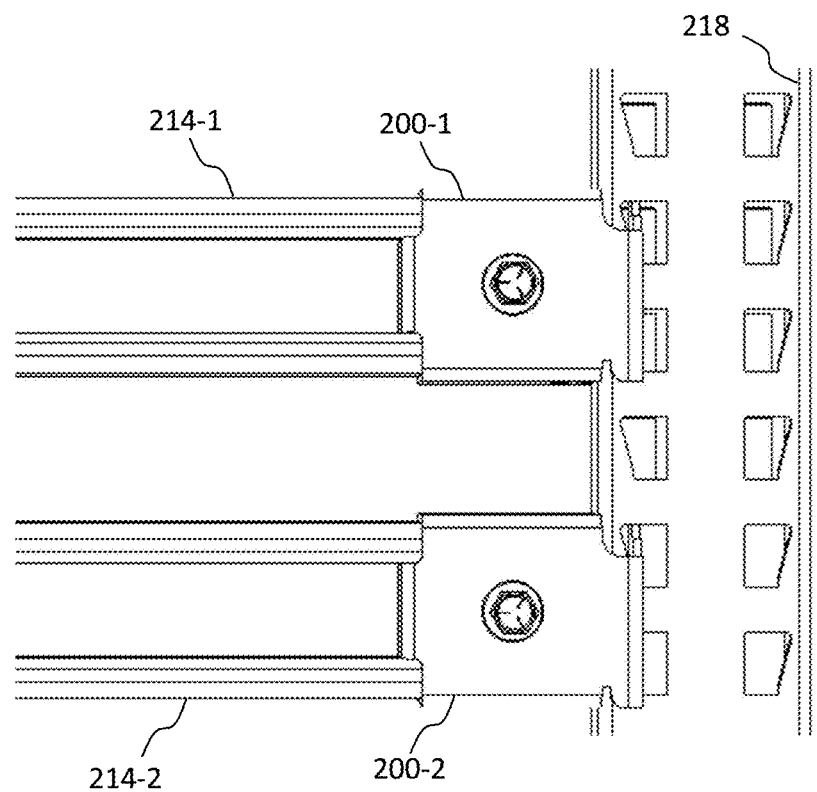
FIG. 25 illustrates a front view of two horizontal struts attached to a vertical strut with an end bracket according to an example of the principles described herein.

FIG. 25 illustrates how end brackets can be positioned along the length of a vertical strut. FIG. 25 also indicates how more than one end bracket can be positioned along the length of a vertical strut. As shown, horizontal strut 214-1 is located at a higher position than horizontal strut 214-2. The lengths of each horizontal strut 214-1, -2 may be adjusted to different lengths to accommodate anomalies in the wall system, struts, and for various other reasons.

Figure 26:
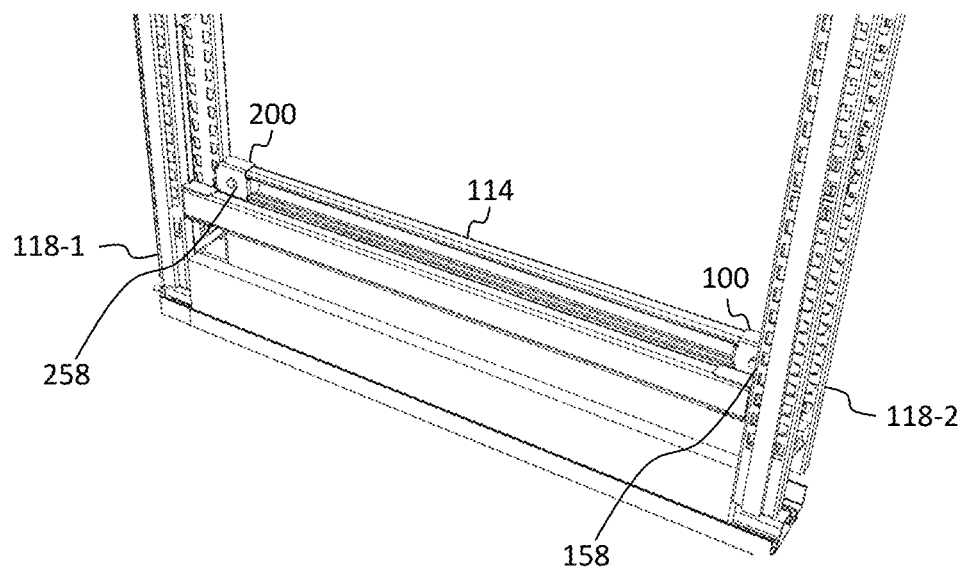
FIG. 26 illustrates a perspective view of a horizontal strut attached between two vertical strut with end brackets according to an example of the principles described herein.

FIG. 26 illustrates both a left end bracket 200 and a right end bracket 100 used to attach a horizontal strut 114 between vertical struts 118-1 and 118-2. Additional structure as shown is used to help create a wall system for a room or other type of space. The horizontal strut 114 may be moved upward and downward to various slots along the vertical struts 118-1, -2 to achieve support at various heights. The end brackets 100 and 200 being screwed together may be easily removed to allow the horizontal strut 114 to be installed and removed without having to remove or rearrange other members of the wall system.

End brackets can not only be used with wall systems, but they may also be used with a modular wall system. For example, they may be used to create walls that can be taken down easily. They may also be used to shorten or widen existing walls.

Installing a wall system with end brackets takes a fraction of the time as present construction methods require and with zero dust and no mess left behind. Components used with the end brackets enable a quick connect type platform that allows creativity, aesthetically pleasing, high-performing, and cost-effective means of achieving a desire space.

The material of the end brackets may be metal, plastic, or a combination thereof. The material may comprise sound absorbing features. Foams, plastic, coatings, cellulosic material, fabric and other materials may also be included.

The end brackets may be a unitary body that is bent at vertical and lateral sides of a body member. Examples further include that a body member have interconnected components. While edges and corners are shown being slightly rounded, the edges may be more sharply defined. At least one of the widths of the body member and attachment structure may be the same as the horizontal strut and vertical strut.

Variations of the wall system include end brackets with multiple points of attachment. With the multiple points of attachment, there is a decreased likelihood of the horizontal strut becoming disjointed from the vertical strut. Such an attachment further provides overall stability of the wall system structure.

Figure 27:
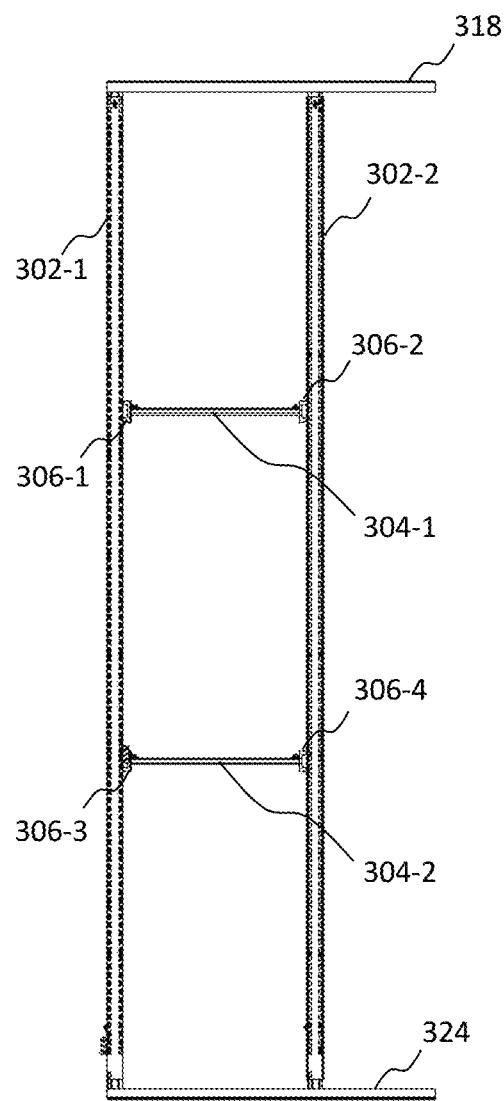
FIG. 27 illustrates a side view of a wall system according to an example of the principles described herein.

FIG. 27 illustrates an example wall system 300 that includes two vertical struts 302-1, -2 attached by two horizontal struts 304-1, -2. Also shown is a top track 318 on top of the vertical struts 302-1, -2 and a bottom track 324 underneath the vertical struts 302-1, -2. A wall system is defined by a configuration of vertical and horizontal struts that are arranged along bottom tracks and capped off with top tracks to form wall enclosures. Furthermore, multiple horizontal struts 304-1, -2 at various heights along the vertical struts 302-1, -2 stabilize the vertical struts 302-1, -2. The horizontal struts also help support wall cladding or other components that are being supported by vertical struts. End brackets 306-1, -2, -3, -4 located at ends of the respective horizontal struts 304-1, -2 attach the ends of the horizontal struts 304-1, -2 to the vertical struts 302-1, -2.

Figure 28:
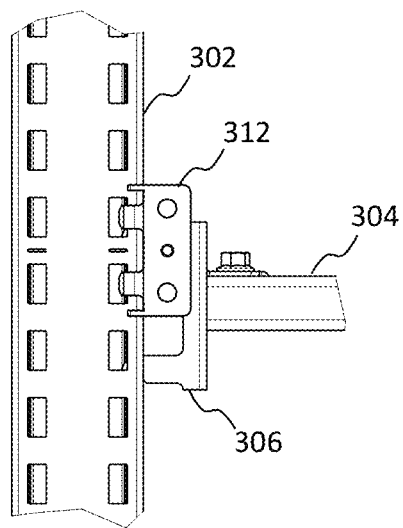
FIG. 28 illustrates a side view of an end bracket with a brace according to an example of the principles described herein.

FIG. 28 illustrates a close-up view of an end bracket 306 that attaches a horizontal strut 304 to a vertical strut 302. The end bracket 306 includes four attachment arms 308-1, -2, -3, -4 (see FIGS. 29 and 32) that provide four attachment points to the vertical strut 302. Each attachment arm 308-1, -2, -3, -4 includes a hooked member that spaces the horizontal bracket away from the vertical strut 302 when attached, such that the horizontal strut 304 does not contact the vertical strut 302. The space allows for some "field" adjustment, or in other words, an effective shortening or lengthening of the horizontal strut if required to accommodate unknown site conditions.

FIG. 28 further illustrates a cladding clip 312 that may be attached to the strut 302 along with the end bracket 306 to provide an additional point of attachment point to a vertical strut 302. For example, the cladding clip may be used to attach cladding to the vertical strut 302. The cladding clip is not attached to the bracket 306 itself. The cladding clip 312 is a flat panel that is affixed to a side of the end bracket 306. The flat panel may be square or rectangular as shown. Two side hooks extend from a side of the flat panel that is adjacent to the vertical strut 302. The two side hooks are to attach to side openings of the vertical strut 302. As shown, the vertical strut 302 includes a set of openings to which the end bracket 306 may be attached. The cladding clip 312 also includes end extensions, which includes elongate elements at ends that extend from the side of the brace 312 and rest against the side wall of the vertical strut 302 for additional structural stability. The cladding clip 312 shown is attached to the side of the end bracket 306 buy a screw or other fastening structure. The cladding clip 312 is to support attachment of the end bracket 306 between the horizontal and vertical strut 302.

Figure 29:
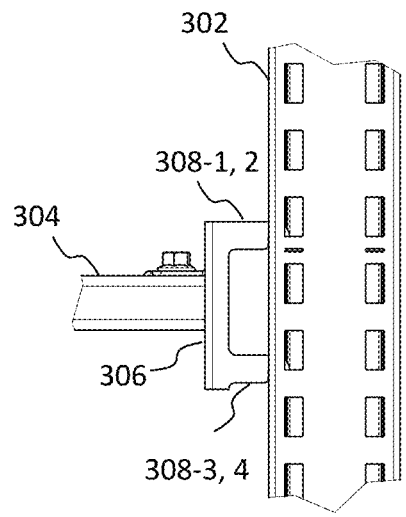
FIG. 29 illustrates a side view of an end bracket that is attached to a horizontal strut and vertical strut according to an example of the principles described herein.

FIG. 29 illustrates a close-up view of an end bracket 306 that attaches to a vertical strut 302. In some example, the brace 312 is omitted and therefore an example is shown of it not being included. The attachment arms 308-1, -2, -3, -4 extend horizontally in a parallel direction with the horizontal strut 304 when attached to the vertical strut 302. The attachment arms 308-1, -2, -3, -4 provide attachment above and below the horizontal strut 304 to prevent upward and down movement of the horizontal strut 304 relative to the vertical strut 302.

Figure 30:
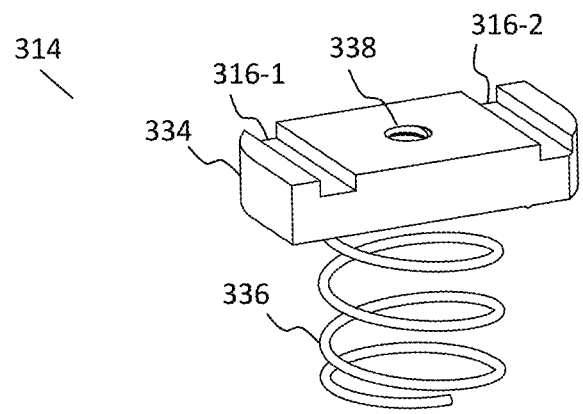
FIG. 30 illustrates a perspective view of a spring nut according to an example of the principles described herein.
Figure 31:
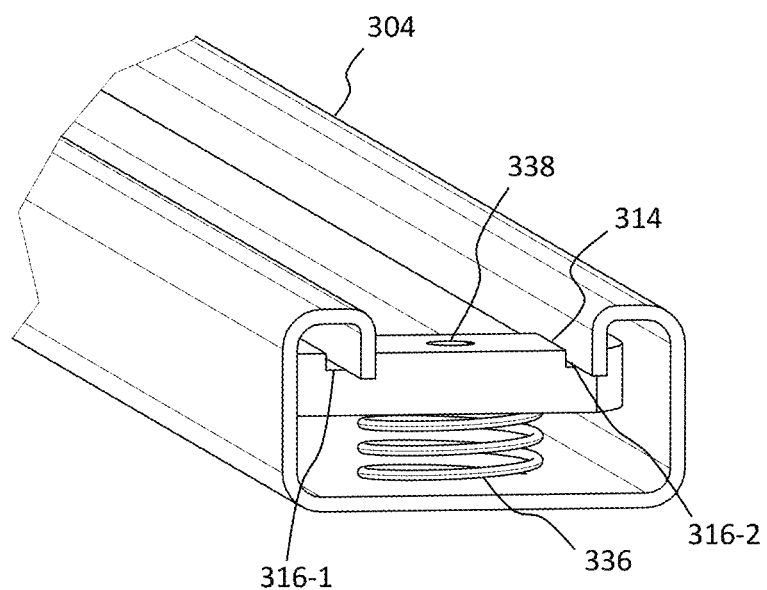
FIG. 31 illustrates a perspective view of a spring nut in a horizontal strut according to an example of the principles described herein.

FIG. 30 illustrates a spring nut 314 and FIG. 31 illustrates a spring nut 314 that is removably received within an elongate cavity of the horizontal strut 304. The spring nut 314 includes a nut 334 with a spring 336 underneath. The spring nut 314 is received within the horizontal strut 304 and is to secure the end bracket 306 to the respective end of the horizontal strut 304. As shown, the spring nut 314 includes a centrally located threaded hole 338. The spring nut 314 further includes a pair of elongate recesses 316-1, -2 arranged in parallel on either side of the top surface of the spring nut 314.

As depicted in FIG. 31, the horizontal strut 304 includes an elongate cavity defined by an elongate base member with side walls that extend perpendicularly outward from the base member. The side walls bend around themselves, to be directed back toward the elongate base member. Ends of the side walls of the horizontal strut 304 rest against the elongate recesses 316-1, -2 for a slidable securement of the spring nut 314 within the horizontal strut 304.

Figure 32A:
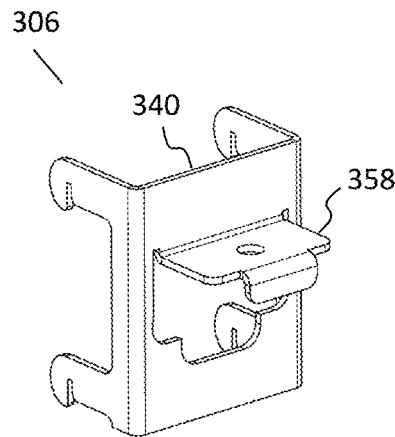
FIG. 32a illustrates a perspective view of an end bracket according to an example of the principles described herein.
Figure 32B:
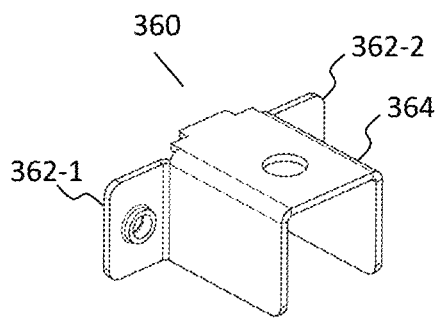
FIG. 32b illustrates a perspective view of a leveling bracket according to an example of the principles described herein.
Figure 32C:
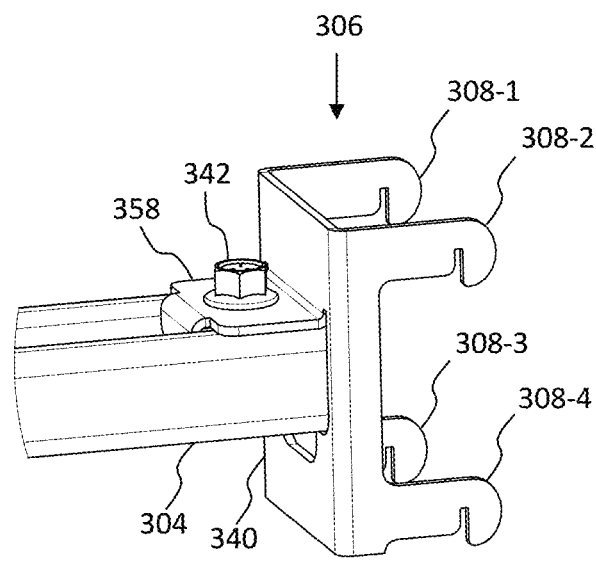
FIG. 32c illustrates a perspective view of an end bracket, spring nut, and horizontal strut according to an example of the principles described herein.

FIG. 32a illustrates a perspective view of an end bracket 306 while FIG. 32c illustrates the end bracket 306 attached to the horizontal strut 304. The end bracket 306 includes a vertical panel 340 with a plurality of attachment arms 308-1, -2, -3, -4 that extend perpendicularly away from the vertical panel 340. The plurality of attachment arms 308 provide a plurality of attachment points for attaching the horizontal strut 304 to the vertical strut 302. As shown, four attachment arms 308-1, -2, -3, -4 extend perpendicularly away from the vertical panel 340. The attachment arms 308-1, -2, -3, -4 are located at corners of the vertical panel 340. As stated above, two attachment arms 308-1, -2 are located above the horizontal strut 304 and two attachment arms 308-3, -4 are located below the horizontal strut 304. Additionally, the attachment arms 308-1, -2, -3, -4 are positioned such that two attachment arms 308-1, -3 are located one side of the horizontal strut 304 and two attachment arms 308-2, -4 are located on the other side of the horizontal strut 304. In the example shown, the end bracket 306 has two attachment points on each side, with each pair being at the same height and same width apart for a symmetrical structure. This configuration anchors the horizontal strut 304 above, below, and on sides of the horizontal strut 304 which prevents vertical, horizontal, and rotational movement of the horizontal strut 304 with respect to the vertical strut 302.

FIG. 32b illustrates a perspective view a leveling bracket 360 that is used with the bottom leveler support. The leveling bracket 360 includes a flat panel 364 that is bent on both sides. A wing 364-1, -2 extends perpendicularly outward from each side of both sides. Each wing 364-1, -2 is attached to the bottom leveler support 326. (see FIG. 35). A screw or other mechanism is threaded to the flat panel 364. With this attachment, a rotation of the screw moves the bottom leveler support 326 upward or downward depending on the direction of the rotation.

Figure 33:
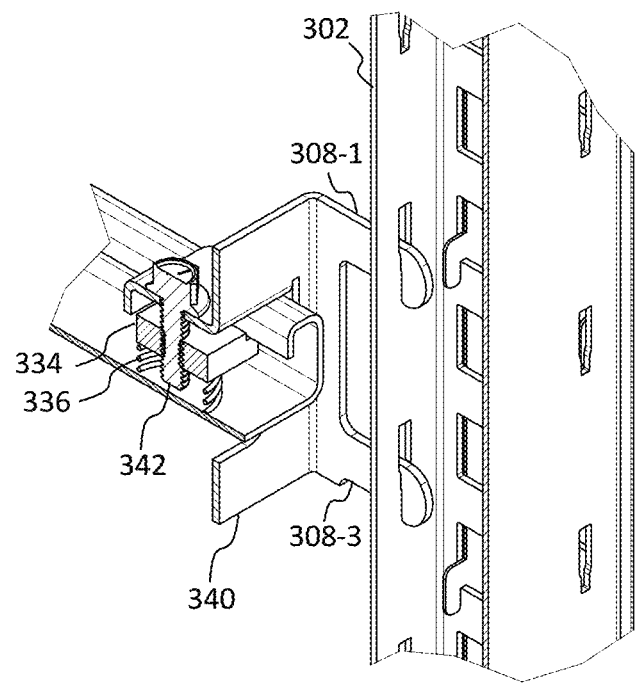
FIG. 33 illustrates a cutout view of an end bracket, spring nut, and horizontal strut according to an example of the principles described herein.

A cutout perspective view of the horizontal strut 304 and its connection to the vertical strut 302 is shown in FIG. 33. Each attachment arm 308-1, -3 (and 308-2, -4, not shown) includes a hook that is to be removably inserted within an opening of a respective vertical strut 302 for securement of the horizontal strut 304 to the vertical strut 302. In another example, the center between the attachment arms 308-1, -2, -3, -4 is off center from the vertical panel 340. In yet another example, the center between the attachment arms 308-1, -2, -3, -4 on the vertical panel 340 is adjustable to various locations on the vertical panel 340.

For attachment, the horizontal strut 304 is slidably inserted within a central opening of the vertical panel 340. The horizontal strut 304 may be positioned at a variable location as desired relative to the vertical panel 340 of the end bracket 306 due to the slidable positioning. The attachment arms 308-1, -2, -3, -4 of the end bracket 306 are attached to a desired position on the vertical panel 340. The spring nut 314 is positioned against the vertical panel 340 of the end bracket 306 and tightened by a screw 342 to tighten the spring nut 314 between the ends of the sidewalls and the base of the horizontal strut 304. The spring provides additional friction within the horizontal strut 304 to support the securement of the spring nut 314 within the horizontal strut 304. The nut 334 of the spring nut 314 is thus held in place by the spring nut 314 against the vertical panel 340 of the end bracket 306 which secures the end bracket 306 to the vertical strut 302.

Figure 34:
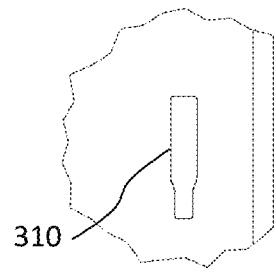
FIG. 34 illustrates an elongate hole in a vertical strut according to an example of the principles described herein.

Turning to FIG. 34, a front view of the opening on a vertical strut 302 is shown. As shown, the opening of the vertical strut 302 includes an elongate opening 310 that decreases in size at a lower end for a friction fit of the end bracket 306 within the vertical strut 302. The hook on the elongate arm 308-1, -2, -3, or -4 is removably inserted in the larger portion of the opening and lowered into the decreased lower end of the opening. The fit is a smaller, tighter, friction fit that makes it so the end bracket 306 does not move relative to the vertical strut 302. As shown, the larger portion of the opening 302 as well as the smaller portion of the opening is a rectangular shape. The larger portion tapers inward and downward into the smaller portion. The larger portion may be more than double the length of the smaller portion, as shown. The larger portion may also have a larger width than the width of the smaller portion, as shown.

Figure 35:
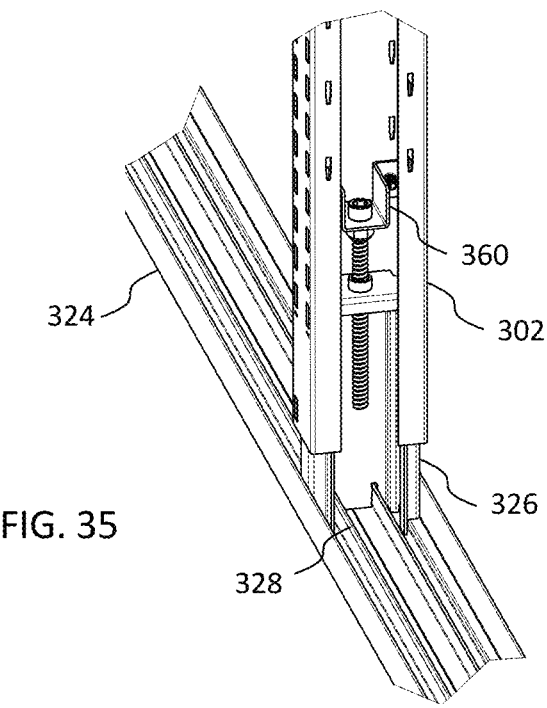
FIG. 35 illustrates a perspective view of a bottom connector connecting a bottom track to a bottom leveler support according to an example of the principles described herein.

Turning to FIG. 35, a bottom connector 328 for attaching the bottom track 324 to a vertical strut 302 is shown. The bottom leveler support 326 includes an elongate member that is slidably inserted within the vertical strut 302. The elongate member has a length and width that fits within the bottom opening of the vertical strut 302. The bottom leveler support 326 on each vertical strut 302 includes a mechanism, such as a bolt that is rotated, to achieve a vertical height adjustment for the vertical strut 302. The vertical strut 302 may be raised to a variable height relative to the bottom leveler support 326. Side screws affix the vertical strut to the top leveler support 322 at the desired height.

Figure 36:
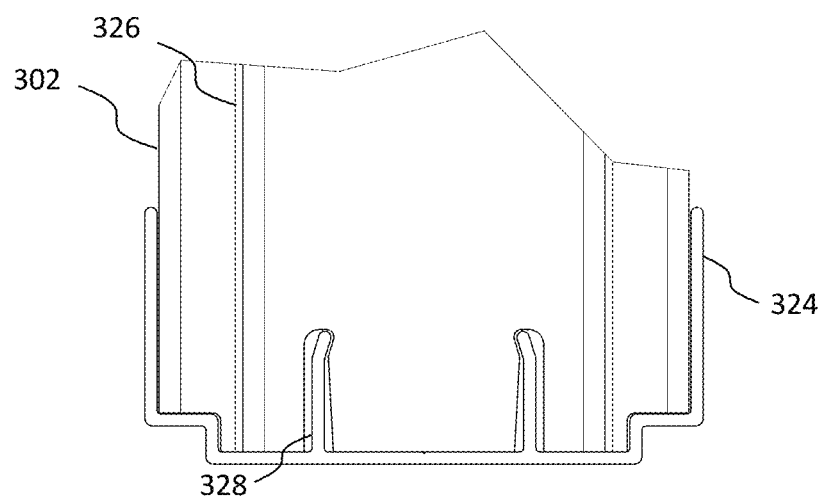
FIG. 36 illustrates a front view of a bottom connector connecting a bottom track to a bottom leveler support according to an example of the principles described herein.

FIG. 36 illustrates a front view of the bottom connector 328 that attaches the bottom track 324 to the bottom leveler support 326 of the vertical strut 302. In an example, the bottom connector 328 includes a form of snap connection for snapping the bottom track 324 to the bottom leveler support 326 of the respective vertical strut 302. Other types of connections include a friction fit, a screw or other fastener, or other type of connection known in the art.

The snap connection may be accomplished with two elongate arms that extend perpendicularly away from the bottom track 324 and bend towards each other at an end portion, each elongate arm to be received within the bottom leveler support 326 for securement of the bottom track 324 to the bottom leveler support 326 for securement of the bottom track 324 to the bottom leveler support 326. The elongate arms are spaced a width apart, each elongate arm extending perpendicularly away from the bottom track 324. Each elongate arm bends at respective end portions to snap into the bottom leveler support 326.

In an example, the elongate arms are resilient and deformable such that when displaced, the elongate arms are biased to return to an original posture. In an example, a space between the elongate arms is greater than half a width of one of the vertical strut 302. In an example, a length between the elongate arms is less than half a width of one of the vertical strut 302. In an example, the elongate arms include at least one of aluminum, steel, or a combination thereof.

Turning to FIG. 37, a perspective view of the top track 318 attached to the top leveler support 322 is shown. Like the bottom of the vertical strut 302, the vertical strut 302 has a top vertical height that may be adjusted. The top height is lengthened with a top leveler support 322.

The top leveler support 322 includes an elongate member that is slidably inserted within the vertical strut 302, as shown in FIG. 38. The elongate member has a length and width that fits within an opening of the vertical strut 302. The top leveler support 322 includes a flat top 346, with stepped ends 350-1, -2. Flat sidewalls 348-1, 2 extend downward a length from each of the stepped ends. Side screws 344-1, -2 affix the top leveler support 322 at a desired height to provide a variable height to the vertical strut 302. A top connector 320 attaches the top track 318 to the top leveler support 322 of the vertical strut 302.

Like the bottom connector 328, the top connector 320 may include a snap connection or other type of connection. The example connection shown in FIG. 39 includes two elongate arms 320 that extend perpendicularly away from the top track 318 and bend at an end portion, each elongate arm to be received within the top leveler support 322 for securement of the top track 318 to the top leveler support 322 for securement of the top track 318 to the vertical strut 302.

Figure 40A:
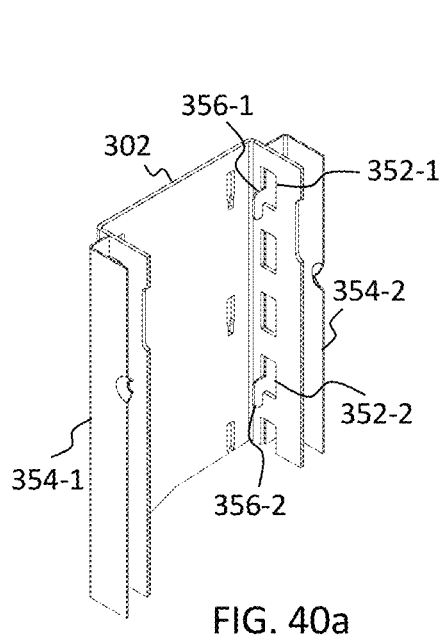
FIG. 40a illustrates a perspective view of a side extender according to an example of the principles described herein.

FIG. 40a illustrates an example of a top portion of a vertical strut 302 with side extenders 354-1, -2. For illustrative purposes, the vertical strut 302 is depicted without a top leveler support 322 in this example. The vertical strut 302 includes holes 352-1, -2 along each side. The holes 352-1, -2 are shown being equally spaced apart, and symmetric on each side, however, the holes 352-1, -2 may be asymmetric in other examples. Hooks 352-1, -2 inserted through holes 352-1, -2 allow the vertical strut 302 to be attached to the side extenders 354-1, -2 at various heights and thus raise and lower the vertical strut 302 to level the top height of the vertical strut 302. As such, a top leveler support 322 as shown in FIG. 38 may not be required.

Figure 40B:
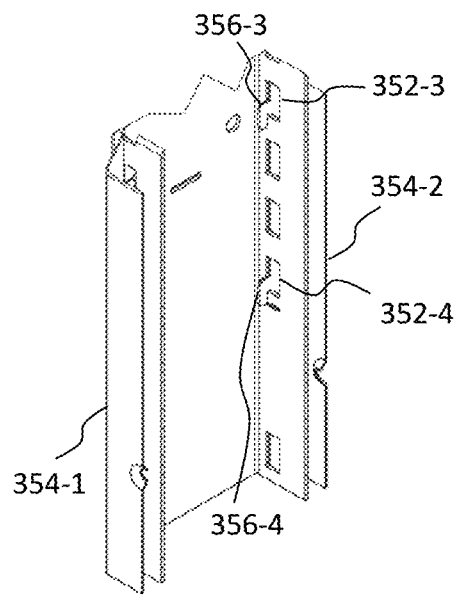
FIG. 40b illustrates a perspective view of a side extender according to an example of the principles described herein.

In FIG. 40b, an example of a bottom portion of a vertical strut 302 with side extenders 354-1, -2 is shown. Hooks 356-3, -4 inserted through holes 352-3, -4 allow the vertical strut 302 to be attached to the side extenders 354-1, -2 at various heights and thus raise and lower the vertical strut 302 to level the bottom height of the vertical strut 302.

Figure 40C:
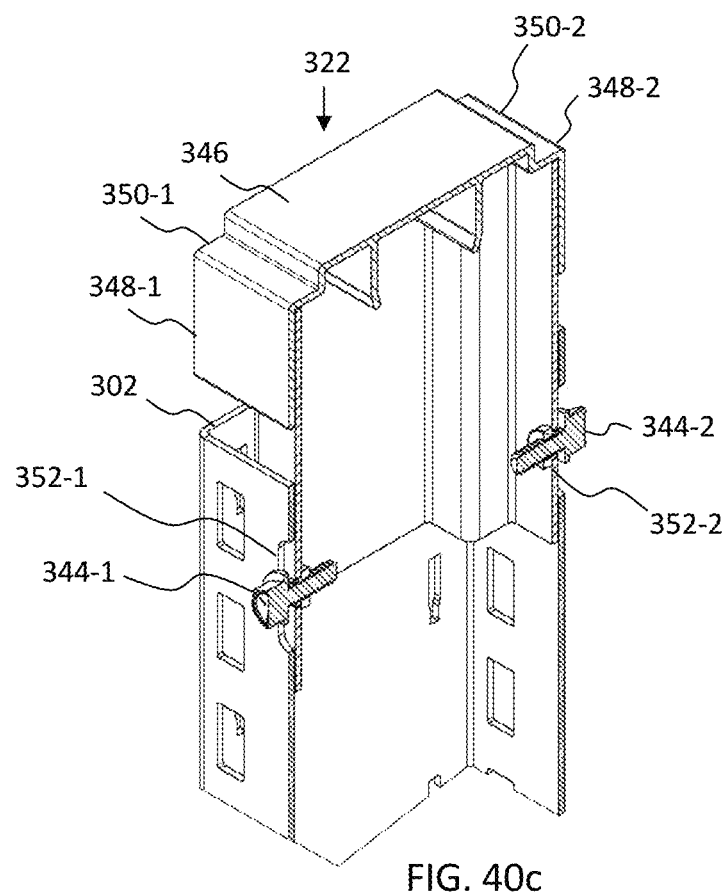
FIG. 40c illustrates a perspective view of a side extender with a top leveler according to an example of the principles described herein.

In FIG. 40c, the vertical strut 302 is shown without side extenders 354-1, -2. In this example, the top leveling assembly 322 is raised and lowered relative to the vertical strut 302. Screws 344-1, -2 are inserted through respective holes 352-1, -2 to secure the top leveling assembly 322 at a desired height.

Figure 41:
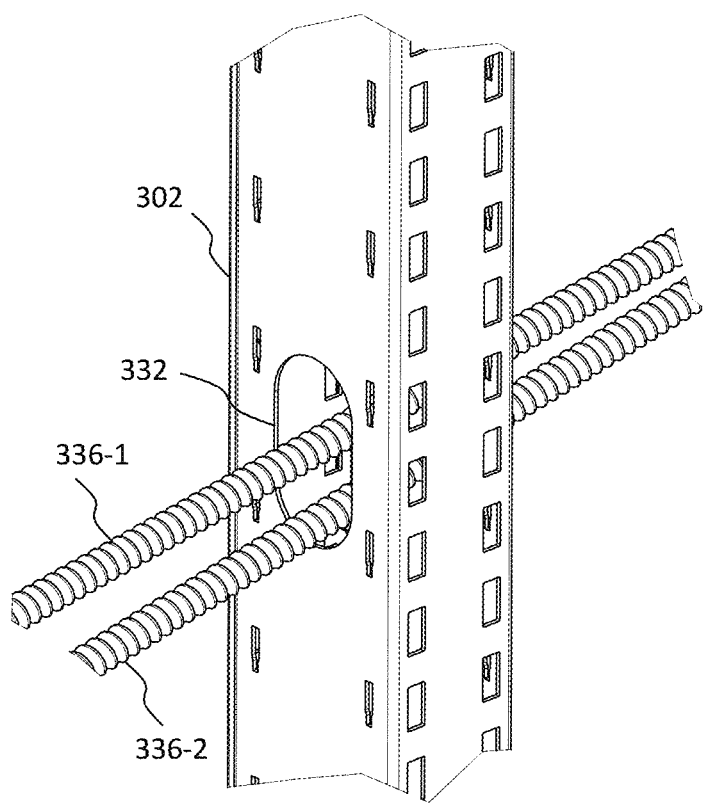
FIG. 41 illustrates an access hole in a vertical strut according to an example of the principles described herein.

In FIG. 41, an access hole 332 is shown that is located along the vertical strut 302 for at least one of an electrical and mechanical wiring 336-1, -2 through the vertical strut 302. The hole may be an oval shaped opening as shown. Mirrored on the opposing side of the vertical strut 302 is the same shape opening, at a same height and position, that provides access for efficient use. The shape of the hole may be other shapes, including rectangle, circle, triangle, or other shape as desired. Various access holes may be located along the length of the vertical and horizontal struts. Also, access holes may be at different or same heights along the length of the vertical struts.

While examples described herein pertain to end brackets being used with horizontal struts, application of end brackets may be used for any structure used for connections within a digitized wall system, modular system, or other type of structure having connecting componentry. The end brackets may be used, for example, not only to shorten or lengthen horizontal struts but also to shorten or lengthen vertical struts. The end brackets may find further usefulness in shortening or lengthening a distance of connection for cabinets, shelving, wall panels, and modular components, for example. Various cabinets, shelving, wall panels, and modular components may attach directly to the end bracket, for example, on the body member or planar plate of the end bracket.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A wall system, comprising:
a pair of vertical struts;
a horizontal strut that is attached between the vertical struts; and
an end bracket at either end of the horizontal strut, each end bracket having a vertical panel with a plurality of attachment arms that extend perpendicularly away from the vertical panel and that provide a plurality of attachment points for attaching the horizontal strut to the vertical struts;
wherein at least one of the end brackets slides with respect to the horizontal strut to adjust to a distance between the pair of vertical struts, the at least one of the end brackets further comprising a locking structure to secure the at least one of the end brackets at a position on the horizontal strut; and wherein each end bracket comprises four attachment arms, two attachment arms above the horizontal strut and two attachment arms below the horizontal strut.

2. The wall system of claim 1, wherein each of the plurality of attachment arms comprise a hook that is removably inserted within an opening of a respective vertical strut for securement, a length of the attachment arms between the vertical panel and the hook facilitating adjustment to the distance between the pair of vertical struts.

3. The wall system of claim 2, wherein the opening of each vertical strut includes an elongate opening that decreases in size at a lower end for a friction fit of the end bracket within the respective vertical strut.

4. The wall system of claim 2, further comprising a cladding clip that attaches to a side of the end bracket, the cladding clip to support attachment of cladding to the respective vertical strut.

5. The wall system of claim 1, wherein the locking structure comprises a spring nut that is removably received within an elongate cavity of the horizontal strut, the spring nut received to secure the end bracket to an end of the horizontal strut.

6. The wall system of claim 5, the elongate cavity of the horizontal strut being defined by an elongate member with side walls that extend outward and bend around themselves, to be directed back toward the elongate member.

7. The wall system of claim 6, the spring nut having a pair of elongate recesses, ends of the side walls resting against the elongate recesses for a slidable securement of the spring nut within the horizontal strut.

8. The wall system of claim 1, further comprising:
a top track at respective tops of the vertical struts;
a top leveler support on each vertical strut that is slidably inserted within a vertical strut structure of each vertical strut and affixed to a desired height for providing a variable height of the respective vertical strut; and
a top connector at each vertical strut that attaches the top track to each top leveler support of the respective vertical strut.

9. The wall system of claim 8, further comprising:
a base track at respective bottoms of the two vertical struts;
a bottom leveler support on each vertical strut that includes structure for providing a variable height of the respective vertical strut; and
a bottom connector at each vertical strut that attaches the bottom track to each bottom leveler support of the respective vertical strut.

10. The wall system of claim 8, wherein each top connector includes a snap connection that snaps the top track to the top leveler support of the respective vertical strut.

11. The wall system of claim 10, wherein the snap connection is provided by two elongate arms that extends perpendicularly away from the top track, the two elongate arms bending toward each other at an end portion, each elongate arm to be received within the respective top leveler support for securement of the top track to the top leveler support.

12. The wall system of claim 8, further comprising an access hole along each vertical strut for at least one of an electrical and mechanical wiring through each vertical strut.

13. The wall system of claim 9, wherein each bottom connector includes a snap connection that snaps the base track to the bottom leveler support of the respective vertical strut.

14. The wall system of claim 13, wherein the snap connection includes a pair of elongate arms spaced a width apart, each elongate arm extending perpendicularly away from the bottom track and bending at respective end portions, the elongate arms to be received within the respective bottom leveler support for securement of the base track to the respective vertical strut.

15. The wall system of claim 14, wherein the elongate arms are resilient and deformable such that when displaced, the elongate arms are biased to return to an original posture.

16. The wall system of claim 14, a space between the pair of elongate arms being greater than half a width of one of the vertical struts.

17. The wall system of claim 14, a length of the elongate arms being less than half a width of one of the vertical struts.

18. A wall system, comprising:
a pair of vertical struts;
a horizontal strut that is attached between the vertical struts;
an end bracket at either end of the horizontal strut, the end bracket having a vertical panel with an attachment arm at each corner of the vertical panel, the attachment arms to provide a plurality of attachment points for attaching the horizontal strut to the vertical struts, wherein at least one of the end brackets slides with respect to the horizontal strut to adjust to a distance between the pair of vertical struts, the at least one of the end brackets further comprising a locking structure to secure the least one end bracket at a position on the horizontal strut;
a top track on top of each vertical strut; and
a top connector at each vertical strut that attaches the top track to a top leveler support of the respective vertical strut;
a base track at respective bottoms of the two vertical struts; and
a bottom connector at each vertical strut that attaches the base track to a bottom leveler support of the respective vertical strut;
the top and bottom connectors each including a snap connection, each snap connection having a pair of elongate arms, the elongate arms bending toward each other, each pair of elongate arms to be received within respective top leveler support and respective bottom leveler support for securement of the top and base tracks to the respective vertical struts,
the elongate arms include properties of being resilient and deformable such that when displaced, each elongate arm is biased to an original posture; and wherein each end bracket comprises four attachment arms, two attachment arms above the horizontal strut and two attachment arms below the horizontal strut.

19. A horizontal strut assembly to connect between a pair of vertical struts of a wall system, the horizontal strut assembly, comprising:
a horizontal strut to be attached between the vertical struts; and
an end bracket at either end of the horizontal strut, each end bracket having a vertical panel with a plurality of attachment arms that extend perpendicularly away from the vertical panel and that provide a plurality of attachment points for attaching the horizontal strut to the vertical struts;
wherein at least one of the end brackets slides with respect to the horizontal strut to adjust to a distance between the pair of vertical struts, the at least one of the end brackets further comprising a locking structure to secure the least one end bracket at a position on the horizontal strut; and wherein each end bracket comprises four attachment arms, two attachment arms above the horizontal strut and two attachment arms below the horizontal strut.

* * * * *